US009692787B1

(12) United States Patent
Warner et al.

(10) Patent No.: US 9,692,787 B1
(45) Date of Patent: Jun. 27, 2017

(54) SYSTEM FOR CONTROLLING BROWSER EXTENSIONS

(71) Applicant: GOOGLE INC., Mountain View, CA (US)

(72) Inventors: Craig Warner, Palo Alto, CA (US); Luke Stone, Menlo Park, CA (US); Timothy Wong O'Connor, Moraga, CA (US); Elysa Fenenbock, San Francisco, CA (US); Ronit Kassis, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/157,346

(22) Filed: Jan. 16, 2014

(51) Int. Cl.
*G06F 21/00* (2013.01)
*H04L 29/06* (2006.01)

(52) U.S. Cl.
CPC .................... *H04L 63/20* (2013.01)

(58) Field of Classification Search
CPC ...................................................... G06F 21/00
USPC ............................................................ 726/1
See application file for complete search history.

(56) References Cited

U.S. PATENT DOCUMENTS

| | | | |
|---|---|---|---|
| 8,200,962 B1 * | 6/2012 | Boodman et al. | 713/161 |
| 2002/0010757 A1 * | 1/2002 | Granik | G06F 17/30876 709/218 |
| 2002/0108050 A1 * | 8/2002 | Raley et al. | 713/193 |
| 2003/0014489 A1 * | 1/2003 | Inala | H04L 29/06 709/204 |
| 2008/0072060 A1 * | 3/2008 | Cannon et al. | 713/185 |
| 2008/0184102 A1 * | 7/2008 | Selig | 715/234 |
| 2008/0235142 A1 * | 9/2008 | Gonze et al. | 705/59 |
| 2009/0064309 A1 * | 3/2009 | Boodaei | G06F 21/52 726/12 |
| 2009/0158140 A1 * | 6/2009 | Bauchot | G06Q 30/02 715/234 |
| 2010/0281273 A1 * | 11/2010 | Lee et al. | 713/190 |
| 2011/0208822 A1 * | 8/2011 | Rathod | 709/206 |

OTHER PUBLICATIONS

"Introducing Content Security Policy", retrieved on Jan. 16, 2014 from https://developer.mozilla.org/en-US/docs/Security/CSP/Introducing_Content_Security_Policy, 2 pages.

* cited by examiner

*Primary Examiner* — William Powers
(74) *Attorney, Agent, or Firm* — Brake Hughes Bellermann LLP

(57) ABSTRACT

A system includes a processor configured to execute a web browser in a first browser execution process initiated by an operating system of the system. The system includes a browser extension installed in the web browser, the browser extension including a markup language file and a file specifying at least one type of action related to a page element on which the browser extension seeks to act. The web browser may be configured to receive a set of rules from a web publisher associated with a first web page prior to rendering the first web page, determine based on the file, without loading the browser extension, that the browser extension is configured to implement a first action prohibited by the set of rules, and restrict the browser extension from implementing the first action on the first web page.

20 Claims, 6 Drawing Sheets

SYSTEM FOR CONTROLLING BROWSER EXTENSIONS

TECHNICAL FIELD

This application generally relates to web technology, and more particularly, to web browser extensions.

BACKGROUND

Web browsers implemented on a web-enabled computing device allow users to access all kinds of content. Web browsers are configured to read programmatic code and render that code as web pages, which may include rendering both audio and visual content contained in various media files (e.g., image, video, and audio files), as well as performing other functions defined in the programmatic code. Web pages are generally implemented using programming languages such as HTML (including HTML5), CSS, and JavaScript, among a number of other available programming languages.

Some browsers allow users to install add-ons (or extensions) to the browser, where such extensions add functionality to the browser and operate as an integrated part of the browser. Browser extensions may be implemented using programmatic code that is written using the same programming languages that are used for implementing web pages, such as JavaScript. From a browser's perspective, extensions effectively function as web pages that are an integrated part of the browser once they are installed. By installing extensions that are of interest to him or her, a user can effectively create a custom browser that includes the functionality of the extensions they choose to install.

In current Internet systems, there is no way to ensure the reliability, security, and integrity of intended content delivery. Publisher websites have established a level of accountability, predictability, and trusted content delivery. However, third party browser extensions have the ability to infiltrate this trusted relationship in ways that can be unclear to the users and potentially damaging to all parties involved. Today, many browsers allow the creation and installation of extensions which can modify or interact with the browser, computer system, or content, in some cases modifying the content is ways that are not allowed or desired by certain parties, such as advertising blockers, advertising injectors, or various malware.

These third party extensions change the direct relationships between the web publisher and the user which, if offered with the right controls, can have positive implications for both parties. However, if no controls are in place, many publishers and content providers may retreat from the open Internet behind closed applications or paywalls, making it more difficult for users to find and enjoy useful content. It is difficult for users to know who and which extensions to trust in this environment.

SUMMARY

According to one aspect, a system includes a processor configured to execute a web browser in a first browser execution process initiated by an operating system of the system. The system includes a browser extension installed in the web browser, the browser extension including a markup language file and a file specifying at least one type of action related to a page element on which the browser extension seeks to act. The web browser may be configured to receive a set of rules from a web publisher associated with a first web page prior to rendering the first web page, determine based on the file, without loading the browser extension, that the browser extension is configured to implement a first action prohibited by the set of rules, and restrict the browser extension from implementing the first action on the first web page.

Other implementations of this aspect include corresponding methods, apparatus, and computer programs, configured to perform the actions of the methods, encoded on computer storage devices.

According to another aspect, a method includes generating a set of rules using a microprocessor of computing device associated with a web publisher, the web publisher being a publisher of a first web page, the set of rules governing management of web browser extension behavior associated with the first web page. The method includes applying the set of rules to control which browser extensions may implement actions on the first web page. A first rule in the set of rules may permit at least one browser extension to reformat the first web page. A second rule in the set of rules may control which types of browser extensions are allowed to operate on the first web page. A third rule may specify a certain type of browser extension to make select changes or substitutions to elements of the first web page. The web publisher may provide the set of rules to a remote server. The remote server may provide access to a web browser to obtain the set of rules. Using the microprocessor of the computing device associated with the web publisher, the web publisher may obtain a record of extension-based interactions with the first web page. Upon detecting that a first browser extension is attempting to implement a first action the first web page, the web publisher may withhold a permission to the first browser extension to implement the first action the first web page, using the set of rules.

Other implementations of this aspect include corresponding systems, apparatus, and computer programs, configured to perform the actions of the methods, encoded on computer storage devices.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

In various examples, a web browser may include or be configured to interact with one or more browser extensions.

In this context, a "browser extension" may include one or more web pages packaged or grouped together as a definable whole, and configured to extend the functionality to the web browser. As described herein, "browser extensions" are small software programs that can modify and enhance the functionality of a web browser. They may be written using web technologies such as HTML, JavaScript, and CSS. Extensions may have little or no user interface. In some implementations, extensions may provide a small user interface icon or other user interface that may modify a browser's "chrome", which is defined herein to include an area outside of a webpage displayed in the browser (such as the borders of a web browser window, which include the window frames, menus, toolbars and scroll bars). Selecting the icon or the other user interface may activate the functionality of the extension within the browser.

Extensions may modify web pages, for example to block advertisements, or in some cases, malicious extensions may inject content, illegal activity, or advertisements to web pages against user intent and potentially harming the web publisher's brand. A web publisher as referred to here means a content provider associated with a web page, such as an online newspaper or online store, as examples.

Therefore in some cases, users visiting websites may have content (articles, text, images, videos, links, ads, etc.) that appears to be coming from a trusted web publisher's system, but in reality, the content has been replaced by third party content without the user or the web publisher knowing. In some cases, advertisers can also lose revenue when charged for ads that are not actually seen. For example, extensions may remove or replaces ads, or may modify an order of elements on the web page. Extensions that are injecting ads might shuffle elements on the page to make sure their ads appear on prime locations at the expense of the web publisher's content.

Systems and methods described here provide a way for web publishers to enable the management of extension behaviors on web pages provided by the web publisher.

Figure 1:
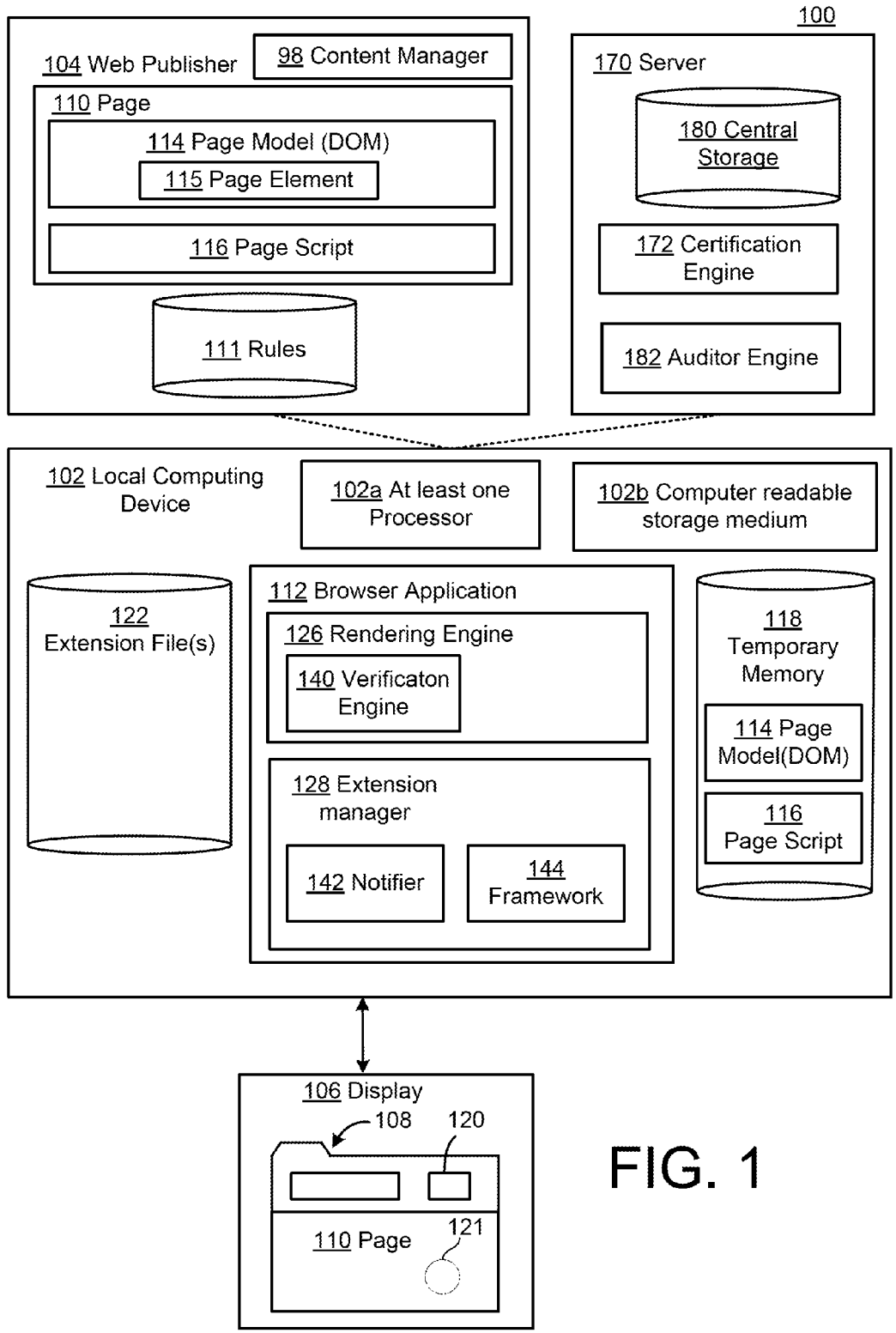
FIG. 1 is a block diagram illustrating an example system that implements browser extensions.

FIG. 1 is a block diagram illustrating an example system that implements browser extensions. In the example of FIG. 1, a local computing device 102 is illustrated as communicating with a remote web publisher 104 in order to provide, using a display 106, a browser window 108 which contains a page 110 that is stored at the remote web publisher 104. The web publisher 104 may be a computing device such as a server, for example.

The local computing device 102 may generally represent virtually any computing device which may be configured to execute a browser application 112, and to communicate with the web publisher 104. For example, the local computing device 102 may include any standard desktop or personal computing device, any laptop, notebook, or netbook computer, any tablet computer, or any Smartphone, television with at least one or more processor, or other mobile computing device. Such computing devices, and other computing devices, may be configured to access the web publisher 104 over one or more computer networks, in various manners, such as the public Internet, private intranet, or other network, to thereby access the web publisher 104. Consequently, the display 106 may be understood to represent virtually any type of display, e.g., monitor, touch-screen, or any other type of visual or auditory display.

In the examples that follow, it is generally assumed that the local computing device 102 and the browser application 112 communicate with the web publisher 104 over the Internet, typically using protocols for identifying, accessing, and rendering the page 110, e.g., from a web server represented by the web publisher 104. However, it will be appreciated that such examples are provided merely for the sake of clarity and conciseness, and, as just referenced above, are not intended to be limiting of the various manners in which the local computing device 102 may obtain, process, or provide content in association with the browser application 112 and the browser window 108.

Thus, in the types of examples just referenced, it may generally be assumed that the page 110 represents any of the many types of webpages which are available over the public Internet. For example, in a simple scenario, the page 110 may represent a substantially static page which includes text, sound, images, advertisements, or other content which may be desired by a user of the local computing device 102 and which may be displayed within the browser window 108. In other examples, the page 110 may include many types of dynamic or interactive content, which often may be manipulated by the user within the context of the browser window 108. In many scenarios, the page 110 and/or associated executable code may be understood to represent an application which may execute partially or completely at the web publisher 104 (e.g., may utilize the processor, memory, and other hardware/software resources of the web publisher 104), while providing associated functionality and features to the user via the browser window 108 (and perhaps executing at least partially locally at the local computing device 102). As just referenced, such webpages and associated functionalities and applications are implementable using various, conventional programming languages and techniques, such as, for example, hypertext markup language (HTML), Asynchronous JavaScript™ (AJAX), eXtensible Markup Language (XML), JavaScript™, JavaScript object notation (JSON), and many other types of code which may be executed.

In the example of FIG. 1, the page 110 at the web publisher 104 is illustrated as including, or being associated with, a page model 114. Generally speaking, the page model 114 provides a data structure which defines the structure, content, and appearance of the page 110 with respect to a programming language in which the page 110 is written.

In specific examples described herein, the page model 114 may represent a document object model (DOM) data structure. Such a DOM, as just referenced, represents a data structure (typically, a tree-like data structure) that itself represents source code (e.g., HTML) of the page 110.

The web publisher 104 may also include a content manager 98, which may be used to define rules 111 which the web publisher 104 can exchange with a browser or application environment. Using the content manager 98 and the rules 111, the web publisher 104 may apply, control, monitor, audit, give, or withhold permissions or rights in real time to extensions or other applications. As one example, an online newspaper may withhold or modify which content it provides based upon which extensions may have control over the content before it is presented to the user. In some implementations, as discussed in more detail below, the web publisher may have access to an auditable record of certain extension-based modifications or interactions with a web page, which can be used for accounting or other purposes. The rules 111 may be stored in a database or other data store. In some cases, the rules 111 may be stored remotely from the web publisher 104 and the web publisher may access the rules 111 on an as-needed basis.

The rules 111 may regulate how content can be moved around on a homepage, or if the content can be pulled from other pages. For instance, Anne may want a customized online newspaper homepage. Anne's homepage might include fashion, travel, and news from my home state. The online newspaper may allow some replacement of the online newspaper's traditional homepage, but may also insist that breaking world news always stay in the same place, as an example. The online newspaper may also allow for personalized targeted ads in some slots, but might keep the banner always the same. Certain rules 111 may set criteria for syndication on other trusted sites, such as timing, formatting, or requiring links to the original content. Certain rules 111 may allow for removal or replacement of ads if another set of criteria is met. For instance, Ben be a paid subscriber to an online newspaper or have a 'pay-per-view' model of news consumption which would allow Ben to skip the ads. The rules 111 may enable crowdsource funding of a favorite story to encourage the author to continue digging into more in-depth research. As an example, a rule may enable contributing money or other value based on an article to offset future costs of the continued story.

As other examples, the rules 111 may include rules to enable the management of extension behavior. An example rule might allow any browser extensions to reformat the page, withhold different kinds of information, or serve information in a different order. Another example rule might control which third party partners are allowed to operate on the page. Another example rule might allow an extension to make select changes or substitutions to elements of the page. The changes or substitutions may be defined per page, per article, or in other ways. As yet another example, a rule may give multiple web publishers a way to define which content could be co-delivered with other publishers. For instance, one online newspaper and another online magazine could enable the news section from the online newspaper to be delivered with the Hollywood section of the online magazine.

As described herein, browser extensions may be utilized in the system 100 to provide additional features or functionalities in association with the browser application 112, and thus with respect to the browser window 108. The functionality of extensions may include but are not limited to observing and modifying network traffic and modifying the page model 114 of the page 110. Other functionality may include interacting with the user, and adding buttons and other user interface elements to the browser and handling their interaction with the user.

As may be understood from the above description, extensions defined by extension files 122 may generally refer to browser extensions, add-ons, plug-ins, web applications (web apps), or any other program code which is designed to augment an appearance or functionality of the browser application 112 in providing the browser window 108 or the page 110. Extension files 122 may in particular perform modifications to network requests related to web page 110, such as canceling requests for individual resources, redirecting the request for web page 110 or referenced resources, modifying request and response headers of web requests related to web page 110, or contributing authentication information to retrieve web page 110. For example, extensions may in some cases, replace ad content 121 in the page 110 with other ad content, or may block the appearance or display of the ad content 121.

In the simplified example of the system 100 of FIG. 1, the extension files 122 are illustrated as being stored locally to the local computing device 102. For example, a user of the local computing device 102 may program and store the extension files 122 for use by the browser application 112. In additional or alternative examples, however, it may be appreciated that some or all of the extension files 122 may be accessed remotely. For example, in many cases, a particular extension may be packaged within a single folder or archive which may then be accessed by the browser application 112. For example, a provider and/or distributor of the extension files 122 (not specifically illustrated in the example of FIG. 1) may construct and package the extension files 122, and a user of the system 100 may thereby download and install a desired extension, including accessing, downloading, and installing the extension files 122 at the local computing device 102, as shown.

The browser application 112 may include a rendering engine 126 that is used to convert the page model 114 of a page 110 into information that can be displayed to the user in browser window 108. The rendering engine 126 may include a verification engine 140 that is used to parses meta tags defined by the framework 144. The verification engine 140 may grant appropriate extensions certain rights to interface or modify the page 110 in accordance with the publisher defined meta tags. The verification engine 140 may perform these actions in real-time. The verification engine 140 may revoke certain extensions the privilege to interface or modify the page 110 in accordance with the publisher defined meta tags. In some implementations, the verification engine 140 may present contractual terms associated with the web publisher 104 to the extension owner, and upon the extension owner's acceptance of the proposed contractual terms, the verification engine 140 may grant that extension the privilege to interface or modify the page 110 in accordance with the terms of the ratified contract. In some implementations, the verification engine 140 may programmatically log the transaction at a server such as the server 170, bill the extension owner, and compensate the publishers at appropriate intervals, as examples.

The browser application 112 may include an extension manager 128 that may be responsible for installing, loading, and executing extensions. It may be responsible for handling communication between the extensions 122 and the rendering engine 126. As such it may dispatch events to certain extensions 122, collect their desired modifications to web requests, send them to the verification engine 140, and send the results back to a network stack. Parts or all of this functionality may be executed by other components or the browser application 112.

The extension manager 128 may also include a notifier 142 that may expose to a web publisher 104 certain browser elements, such as DOM elements. As discussed in more detail below with respect to FIG. 3, the DOM elements may include, for example, a name of certain or of each browser extension installed on the local computing device 102 or the browser application 112, a classification enumeration for each extension, or a list of operations or actions that each browser extension may perform on a given web page (for example, create, read, update, delete).

In some cases, the extension manager 128 may also include a framework 144 (which may be programmed for example in JavaScript™) that allows publishers to programmatically iterate over a list of browser extension DOM elements. The framework 144 facilitates insertion of publisher-defined web page meta tags that may regulate how specific extensions may interoperate with the page 110. The framework 144 may specify classifications of extensions may interoperate with the page 110. The framework 144 may specify how operations or actions in general may be applied to the page 110, such as update, read, delete, write, etc. In some implementations, the framework 144 may facilitate the definition of contractual terms by which a web publisher 104 may request payment from an extension owner for the right to perform various operations or actions on the page 110.

Of course, it may be appreciated that the browser application 112 may include, or be associated with, various features, functions, operational modules, or other elements which are not specifically illustrated in the context of FIG. 1. Similarly, it may be appreciated that the terminology used in association with the rendering engine 126 and the extension manager 128 is merely for the sake of example, and that the various types of browser applications 112 which exist, or which may exist in the future, may use different terminology when referring to the various concepts described herein.

The system 100 may also include a remote server 170. The server 170 may include a central storage component 180, a certification engine 172, and an auditor engine 182. In some cases, the central storage component 180 may store an audit trail or log corresponding to acts of various extensions on web pages. The certification engine 172 may be used to certify that browser extensions perform only the acts they are defined to perform. For example, the server 170 may automatically certify certain browser extensions, and assign those certified browser extensions classifications or sign the browser extensions with digital certificates based on auditing or test results of actions performed by the browser extensions (i.e., to verify that the browser extensions perform only the actions they allege to perform). The auditor engine 182 may be used to track and log certain actions of various browser extensions, e.g., in conjunction with the central storage component 180 and to evaluate the actions based on permissions and definitions associated with the extensions, which may also be stored in the central storage component 180.

In some cases, the browser application 112 may access the central storage component 180 in real time to determine that an extension installed in the browser application has certain permissions. The browser application 112 may share that information with a web publisher 104 associated with a page 110. For example, as discussed in more detail below with respect to FIG. 3, the browser which is requesting a page or a type of content may notify a web publisher 104 that the browser application 112 has extensions A, B, and C installed, and these extensions may do actions X, Y, and Z. The web publisher 104 may then, based on this information, choose to perform certain actions such as withhold content, serve a different form of the content, redirect a user of the browser application 112 to a different type of content (e.g. PDF or image), etc. When a user receives the content, the user may see how a browser extension has changed content from an original page provided by the web publisher 104.

As also shown in the example of FIG. 1, the browser application 112 may include an extension manager 128 which may be configured to implement some or all of the functionality of a particular extension, such as an extension associated with the extension files 122. For example, the extension manager 128 may be configured to cause the rendering engine 126 to execute or otherwise render particular files or pages associated with the extension of the extension files 122. The extension manager 128 may also be configured to execute background pages and content scripts, as discussed in more detail below with respect to FIG. 2. For example, a content script may be written to examine any page loaded in the browser application 112 for rendering within the browser window 108 in order to detect a presence of a specific type of content (e.g., a non-linked webpage, or an RSS feed). That is, the content script may execute such techniques on content of any webpage loaded and rendered within the browser window 108. In the event that the content script detects the specified type of content, the content script may pass a message to the extension so as to notify the extension of the detected presence of the specified type of content. In some cases, the extension may perform an actual modification of the browser window 108, (e.g., to execute a page action with respect to browser window 108, such as displaying the extension icon 120).

In the example of FIG. 1, the browser application 112 is illustrated including discrete functional modules. However, it may be appreciated that such illustration is merely for the sake of example, and that other implementations are possible. For example, a single element of the browser application 112 may be implemented by two or more elements. Conversely, two or more components of the browser application illustrated in FIG. 1 may be executed using a single component. Further, in the example of FIG. 1, the local computing device 102 is illustrated as including at least one processor 102a, as well as computer readable storage medium 102b. That is, for example, the local computing device 102 may rely on two or more processors executing in parallel to achieve a desired result. Meanwhile, the compute readable storage medium 102b may represent any conventional type of computer memory which may be used, for example, to store instructions which, when executed by the at least one processor 102a, cause the browser application 112 to perform various functions, and other relevant functions described herein. Additional or alternative example implementations of the system 100 of FIG. 1 are possible.

Figure 2:
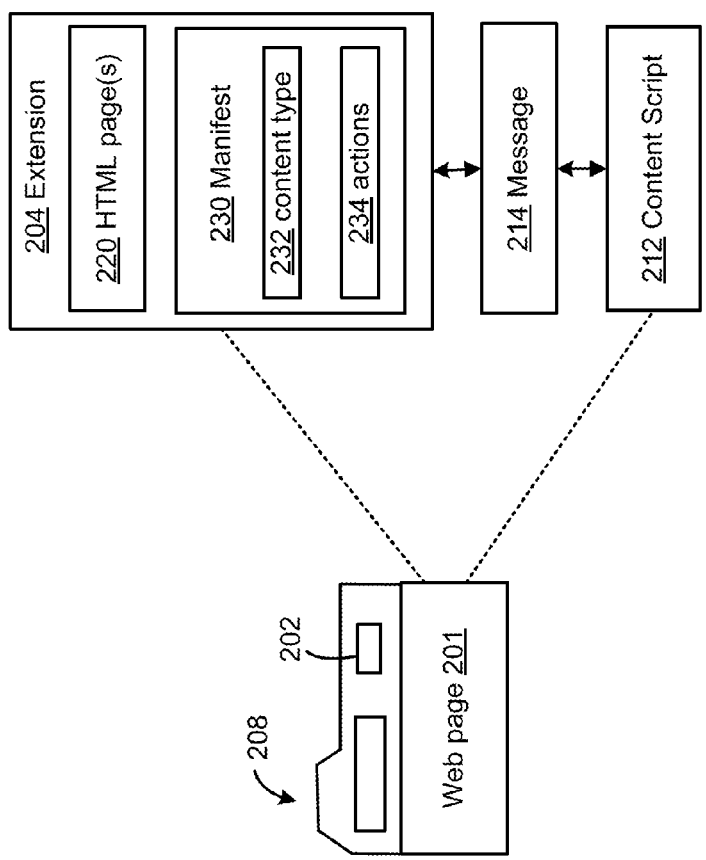
FIG. 2 is a block diagram of an example of a browser extension in a web browser.

FIG. 2 is a block diagram of an example of a browser extension in a web browser. As referenced above, extension files may include various different types of files. For example, an extension 204 as shown in FIG. 2 may include a manifest file 230 which gives information about the extension 204, such as, for example, the most important files and the capabilities that the extension might provide and the permissions the extension may have to interact with web pages and with a browser application. For example, the manifest 230 may include a name of the extension and at least one content type 232 that the extension 204 seeks to act on. For example, a content type may be an image, text, hyperlink, etc. The manifest 230 may also indicate one or more actions 234 or operations that may be performed by the extension 204, such as read, write, update, delete, etc., as described in more detail below with respect to FIG. 3. It may be appreciated that, as referenced above, extensions may include various other types of files. For example, the extension 204 may include at least one HTML page 220, such as, for example, an HTML page associated with a browser action providing a pop-up window in association with the browser window 208 or a content script file 212 that is capable of modifying the content of a page model of a webpage 201 to be displayed within the browser window 208.

With respect to the execution of the extension 204, other than the content script 212 as described below, execution thereof may proceed similarly to, but in a separate process than that of, the rendering engine of the browser application shown in FIG. 1. The content script 212 may represent, or include, a script which enables an associated extension to interact with webpages, e.g., the web page 201. For example, the content script 212 may be implemented as JavaScript™ that executes in the context of the web page 201 as loaded into the browser.

Content scripts can find unlinked URLs in web pages and convert them into hyperlinks, increase font size to make text more legible, and add or block advertisements or other content. Content scripts can indirectly use browser APIs, get access to extension data, and request extension actions by exchanging messages with their parent extension. Content scripts can also communicate with web pages using the page model (e.g., DOM) shown in FIG. 1.

The content script 212 code may always attempt to be injected in a webpage, or may only sometimes be injected depending upon how the content script is written. Further, an extension 204 can insert multiple content scripts into a page, and each of these content scripts may have multiple files such as JavaScript™ and CSS files.

Content scripts, generally speaking, may be configured to, for example, read details of webpages visited by a browser application, and may be further configured to make changes to such pages. For example, the content script may be configured to read and/or modify the page model (e.g., DOM) of the page 201. In example implementations, however, the content script may be restricted from accessing or modifying the page model (e.g., DOM) of the web page 201 by the rendering engine of the browser application based on rules provided by a web publisher associated with the web page 201, as discussed above with respect to FIG. 1. In this way, the web publishers may manage or track extension behavior on certain web sites.

Figure 3:
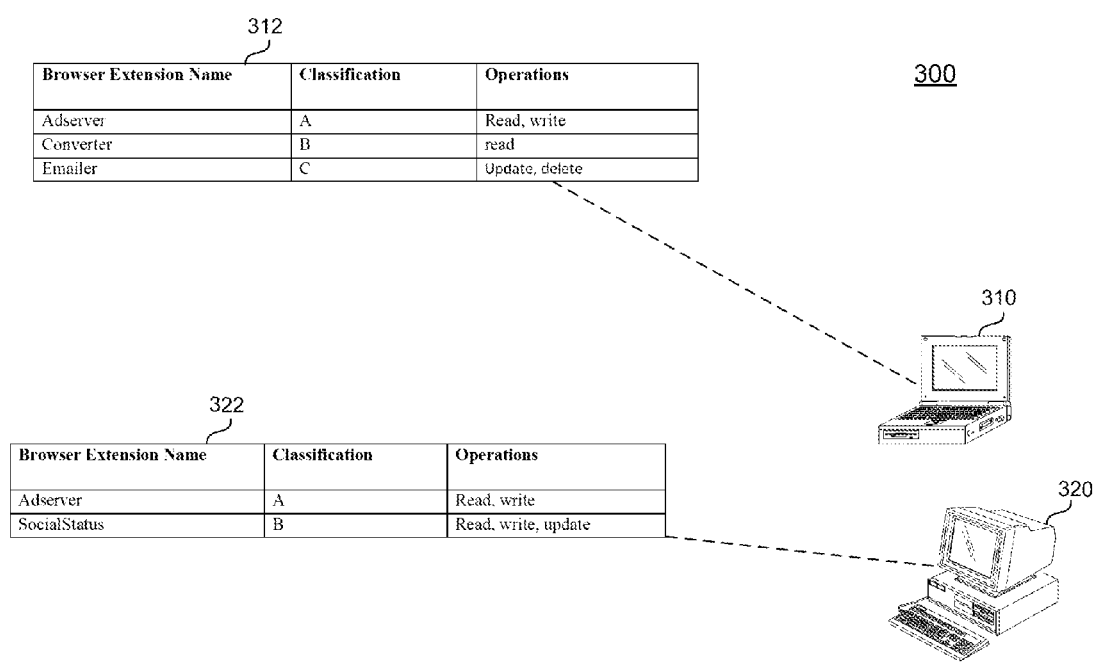
FIG. 3 is a block diagram of example classifications and operations of browser extensions.

FIG. 3 is a block diagram of example classifications and operations of browser extensions. The system 300 shown in FIG. 3 includes two computing devices, a device 310 and a device 320. Each of the devices may include a browser application such as the browser application described above with respect to FIG. 1. The browser application may include browser DOM elements that expose to a web publisher, such as the web publisher shown in FIG. 1, various browser extension elements, with user consent. For example, the browser extension elements may include a name of each browser extension installed on the device, a classification enumeration for each extension, and a list of operations each browser extension may perform on a given web page (for example, create, read, update, delete).

For example, as shown in FIG. 3, various browser elements 312 may be exposed to a web publisher by the browser application of the device 310. The browser elements 312 include the names, classifications, and operations of three browser extensions installed on the browser application operating on device 310. The first browser extension has a name "Adserver", a classification "A", and operations "Read, write." The second browser extension has a name "Converter" a classification "B" and operations "Read." The third browser extension has a name "Emailer" a classification "C" and operations "Update, delete".

As another example, the browser elements 322 are associated with the browser application operating at device 320. The browser elements 322 include the names, classifications, and operations of two browser extensions installed on the browser application operating on device 320. The first browser extension has a name "Adserver", a classification "A", and operations "Read, write." The second browser extension has a name "SocialStatus" a classification "B" and operations "Read, write, update."

A client-side framework (for example in JavaScript) such as the framework 144 of FIG. 1 may allow web publishers to programmatically iterate over the list(s) of browser extension DOM elements. This framework facilitates insertion of publisher-defined web page meta tags that regulate how specific extensions may interoperate with a web page served by the web publisher. The classifications of extensions may interoperate with the page. Operations in general may be applied to the web page. The framework may facilitate the definition of contractual terms, for example by which a web publisher may require payment from an extension owner for the right to perform various operations on a page.

Figure 4:
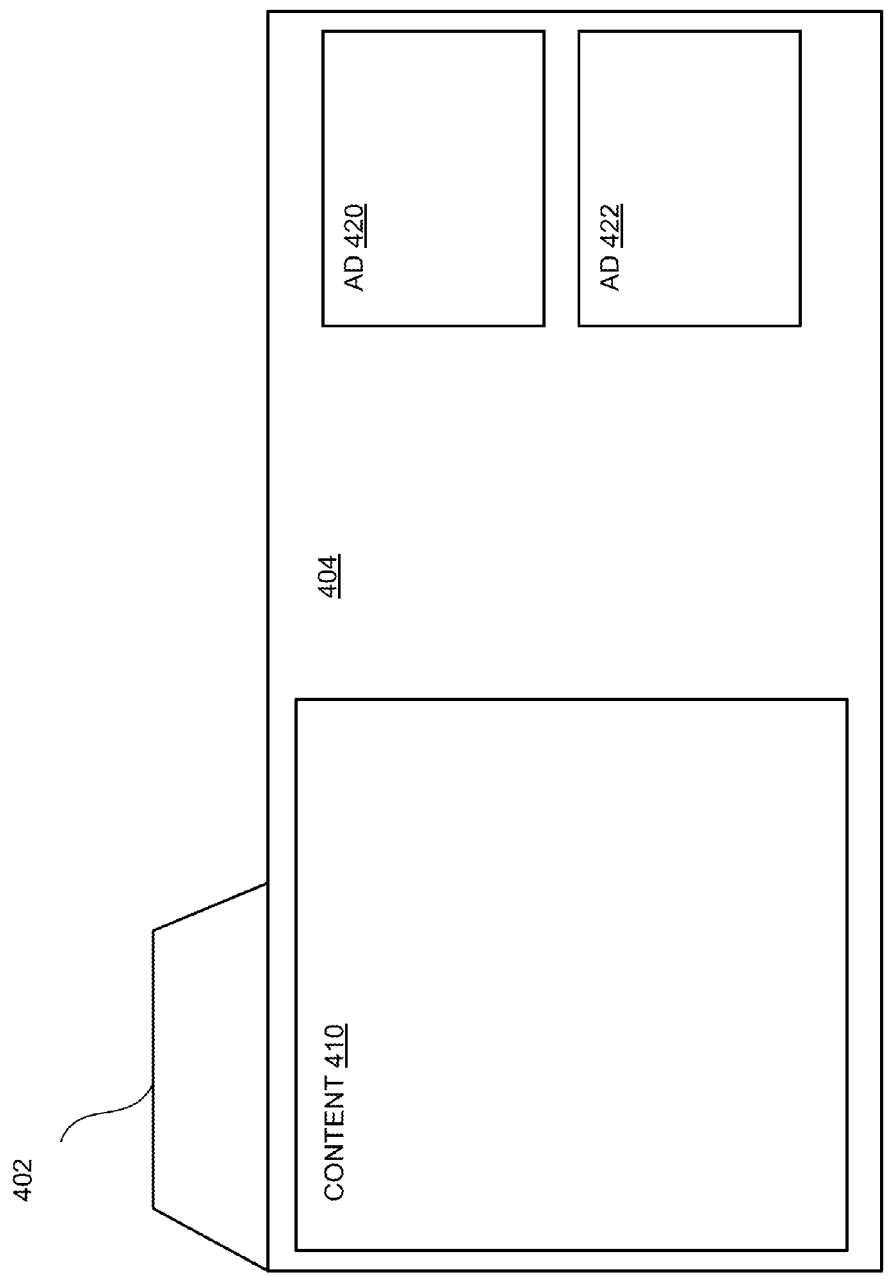
FIG. 4 is a diagram of an example user interface of a web browser.

FIG. 4 is a diagram of an example user interface of a web browser. The user interface may be implemented in a tab 402 or window of a web browser such as the browser application discussed above with respect to FIG. 1. The tab 402 may display a web page 404 including content 410 as well as ad 420 and ad 422. In some cases, an extension operating in the browser application may seek to modify or block one of the ads, such as the ad 420. In some cases, an extension may seek to replace the content 410 with other content not provided by a web publisher. In some cases, an extension may seek to replace the ad 422 with another ad or with other content.

For web publishers to maintain trusted brand integrity and authority, they need better control over the content they provide. Control over the extensions is twofold. In the current business model a web publisher, such as a newspaper, is organized to serve ads in order to continue to deliver free or low cost content to the end user. Furthermore, the newspaper has legal obligations to its advertising partners to ensure brand integrity is maintained by appropriately serving ads against the right stories. For instance, a chocolate supplier might not want its advertisements placed next to a story related to increased diabetes and obesity rates. Today's ad-blocker extensions, at best, remove revenue sources that publishers use to ensure continued high-quality low cost content delivery to its users. Today users agree to the implied terms of service from service providers to receive content in combination with advertising, or have the opportunity to opt-out by purchasing into models that give them limited advertising or add-free content. But, the extension mentioned above, merely blocks ads from being served. In another scenario, the ad-extension replaces the newspaper ads for its own, creating liability for the newspaper when the chocolate ad gets served against the wrong article.

Extensions can also provide service to publishers that they might not otherwise be able to self-support. For instance, Mamie's Lodge, a local B&B has finally established a web-presence. As a trusted brand, they have also started serving local ads on their reservations site. Mamie's Lodge would like to enable a trusted extension to provide currency conversion on their site, but Mamie's Lodge does not currently have the ability to control whether its users are getting accurate conversion rates.

Extensions also affect users. For example, Susie reads the fashion, weather, and wedding section of the online newspaper everyday. She also likes to read the topline news, but this is usually at the bottom of her list. She would love to have a personalized online newspaper homepage that puts her favorite articles first. She could actively choose her favorite articles, but would prefer not to spend the time doing so. If she could install an extension that would track how much time and how often she reads sections of the newspaper and update the article layout of personalized homepage accordingly, then she would read the online newspaper even more. The online newspaper would like to support this effort but doesn't yet have the capabilities. If they could control who the provider of this service was, then they would be able to ensure brand integrity and offer a better user experience.

As yet another example, extensions can provide services to users of mobile devices. For example, Tom just bought the latest smart watch. He is trying to stay away from his devices as much as possible, but there are a few headlines he is always on the lookout for. If he could have certain online newspapers push specific topics to his watch, which would be integral to his fast-paced workday. These publishers might co-mingle their content if they could guarantee the right delivery.

Figure 5:
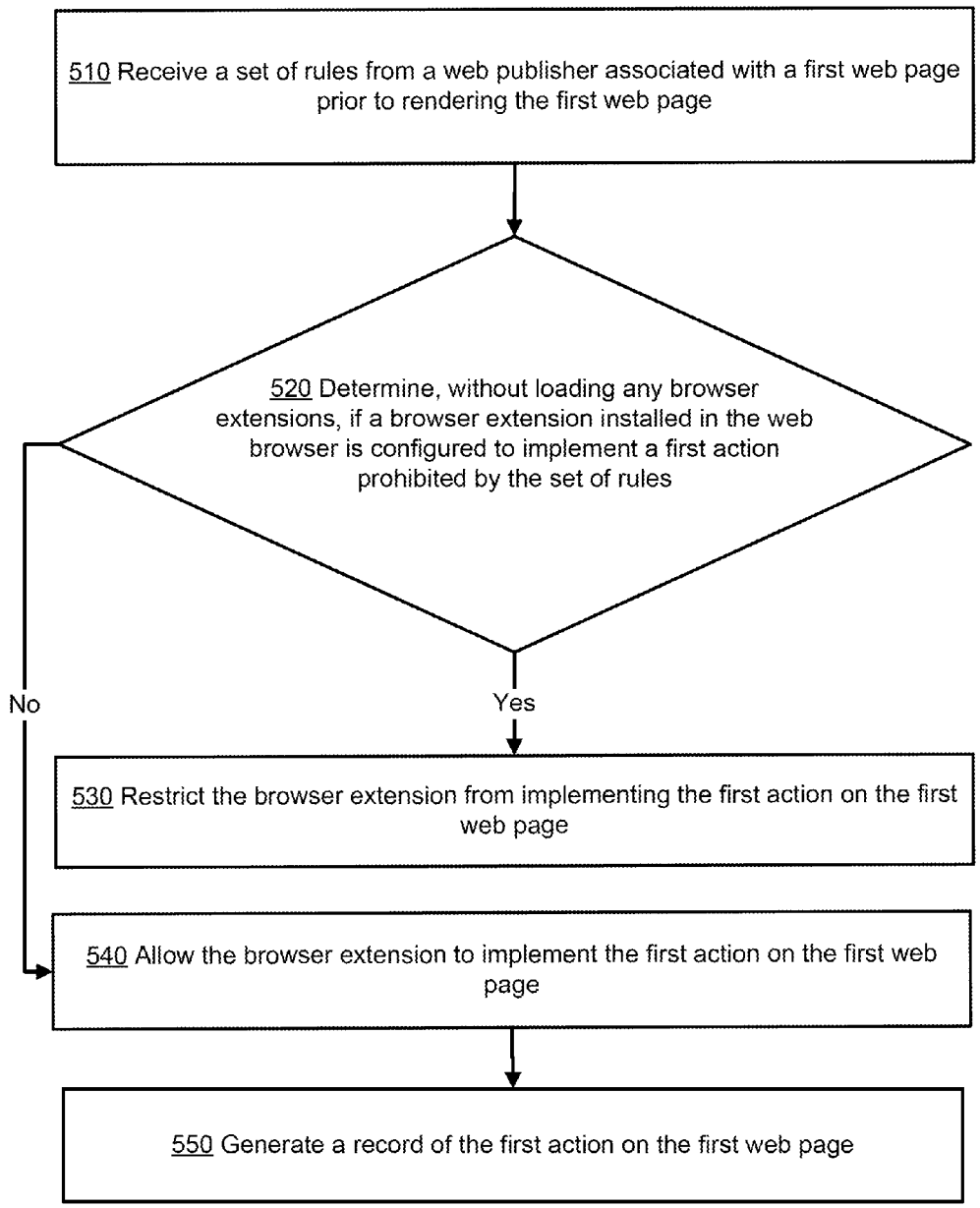
FIG. 5 is a flowchart illustrating a process for enabling trusted browser extensions, in accordance with an example implementation.

FIG. 5 is a flowchart illustrating a process for enabling trusted browser extensions, in accordance with an example implementation. The process shown in FIG. 5 may be performed at least in part by a computer system such as the system 100 shown in FIG. 1, for example using the browser application 112 of the local computing device 102 shown in FIG. 1. The system may receive a set of rules form a web publisher associated with a first web page prior to rendering the first web page (510). For example, the browser application 112 shown in FIG. 1 may receive a subset of rules from the rules 111 from the web publisher 104, prior to rendering the page 110 using the rendering engine 126.

The system may determine, without loading any browser extensions, that a browser extension installed in the web browser is configured to implement a first action prohibited by the set of rules (520). For example, the system may use the framework 144 to determine that a browser extension is configured to delete content on a web page, and that the rules prohibit deleting content on that web page. Thus, the system may restrict that browser extension from implementing the first action on the first web page (530). Of course, it will be understood the system may restrict the browser extension from implementing multiple actions at a time. Alternatively, if the system determines that the browser extension installed in the web browser is not configured to implement the first action prohibited by the set of rules, the system may allow the browser extension to implement the first on the first web page (540). The system may generate a record of the first action on the first web page (550). For example, the system may log a name of a browser extension that updated advertising content on the first web page. In some cases, the system may send the record to a central storage component 180 of a remote server 170, as shown in FIG. 1, which may in turn be accessed by a web publisher with appropriate permissions.

The process shown in FIG. 5 may operate on multiple (e.g., all) extensions installed in a web browser at the same time, and in some cases, the system may restrict multiple extensions (or in some cases, all installed extensions) from implementing one or more given actions on a given web page at the same time, in real-time, without any delay from a user's perspective.

Figure 6:
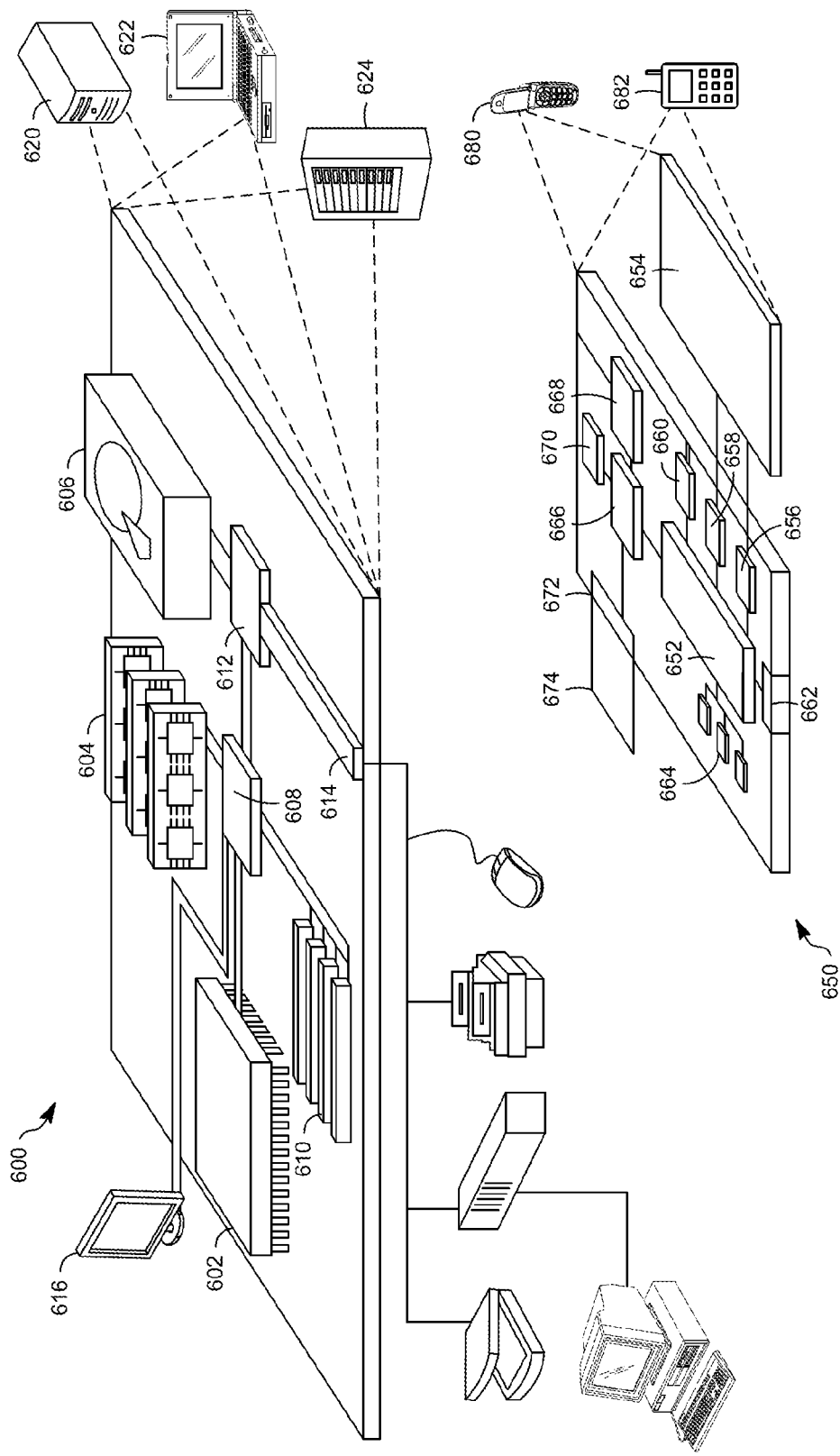
FIG. 6 is a diagram illustrating a computing device and a mobile computing device that can be used to implement the techniques described herein in accordance with an example embodiment.

FIG. 6 is a diagram that shows an example of a generic computer device 600 and a generic mobile computer device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provided as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, which may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A system comprising a processor configured to:
   execute a web browser in a browser execution process initiated by an operating system of the system; and
   execute a browser extension installed in the web browser, the browser extension including a markup language file and a file specifying at least two types of actions related to a page element of a web page on which the browser extension seeks to perform,
   wherein the web browser is configured to:
      expose information identifying the at least two types of actions to a web publisher associated with the web page;
      receive from the web publisher, in response to the information identifying the at least two types of actions, a set of permission rules for respective ones of the types of actions, the set of rules determined responsive to the types of actions, the rules being received prior to rendering the web page, the set of permission rules specifying for respective ones of the types of action which of the types of actions may be performed,
      determine, based on the at least two types of actions, the set of rules, and without loading the browser extension, that the browser extension is configured to implement a first action of the at least two types of actions that is restricted by the set of rules, and a second action of the at least two types of actions that is permitted by the set of rules,
      restrict the browser extension from implementing the portion of the markup language file associated with the first action on the web page, and
      allow the browser extension to implement another a second portion of the markup language file associated with the second action on the web page.

2. The system of claim 1, wherein the web browser is further configured to:
   generate a record of the second action on the first web page.

3. The system of claim 2, wherein the web browser is further configured to send the record to a remote data store.

4. The system of claim 3, wherein the remote data store includes an audit trail including the record.

5. The system of claim 2, wherein the web browser is further configured to send the record to the web publisher.

6. The system of claim 1, wherein the web browser is further configured to:
   notify the web publisher that the browser extension was restricted from implementing the first action on the web page.

7. The system of claim 1, wherein the web browser is further configured to:
   display a notification associated with the web browser indicating that the browser extension was restricted from implementing the first action on the web page.

8. The system of claim 1, wherein the web browser is further configured to:
   determine that at least one of multiple browser extensions installed in the web browser are configured to implement the first action prohibited by the set of rules; and
   restrict the one of the multiple browser extensions from implementing the first action on the web page.

9. The system of claim 1, wherein the browser extension executes in an execution process separate from a browser execution process in which the web browser operates.

10. The system of claim 1, wherein the web page is rendered by a renderer process of the web browser.

11. A method comprising:
   exposing, by a web browser executing on a computing device to a remote server associated with a web publisher of a web page, information specifying a plurality of actions of a web browser extension for the web page;
   receiving from the remote server, in response to exposing the information specifying the actions to the remote server, and by the web browser executing on the computing device, a set of permission rules for respective ones of the actions, the set of rules determined in response to the information specifying the actions, the set of permission rules specifying for respective ones of the action which of the actions may be performed;
   determining, by the web browser, and without loading a browser extension, that the browser extension is configured to implement a first action for the web page prohibited by the set of rules, the browser extension being installed in the web browser, the determining based on the set of rules and the information specifying the actions, the information specifying the actions included with the browser extension that specifies types of actions related to a page element on which the browser extension seeks to perform; and
   restricting the browser extension from implementing the first action on the first web page, while simultaneously permitting the browser to implement a second action of the web page.

12. The method of claim 11, further comprising:
generating a record of the second action on the web page.

13. The method of claim 12, further comprising:
providing the record to a remote data store.

14. The method of claim 13, further comprising:
storing the record in an audit trail.

15. The method of claim 12, further comprising:
sending the record to the web publisher.

16. The method of claim 11, further comprising:
notifying the web publisher that the browser extension was restricted from implementing the first action on the web page.

17. The method of claim 11, further comprising:
displaying a notification within the web browser indicating that the browser extension was restricted from implementing the first action on the web page.

18. A non-transitory computer readable medium containing instructions that when executed cause a microprocessor of a computer system to:

expose to a web publisher of a web page, information specifying at least two types of actions of a web browser extension for the web page;

receive from the web publisher, in response to the exposing the information specifying the types of actions to the web publisher, a set of permission rules for respective ones of the types of actions, the set of rules determined in response to the exposing the information specifying the types of actions, the set of permission rules specifying for respective ones of the types of action which of the types of actions may be performed;

determine, without loading a browser extension, that the browser extension is configured to implement a first type of action prohibited by the set of rules for the web page and a second type of action permitted by the set of rules for the web page, the browser extension being installed in a web browser, the browser extension including a markup language file and the information specifying the at least two types of actions related to a page element of the web page on which the browser extension seeks to perform; and block the browser extension from implementing the portion of the markup language file associated with the first action on the web page while allowing the browser extension to implement another portion of the markup language file associated with the second action on the web page.

19. The non-transitory computer readable medium of claim 18, wherein the first type of action is a write operation.

20. The non-transitory computer readable medium of claim 19, wherein the instructions further cause the microprocessor to display a notification within the web browser indicating that the browser extension was restricted from implementing the first action on the web page.

* * * * *